(12) United States Patent
Otsuka et al.

(10) Patent No.: US 8,977,017 B2
(45) Date of Patent: Mar. 10, 2015

(54) SYSTEM AND METHOD FOR SUPPORT OF MEDICAL DIAGNOSIS

(75) Inventors: Takeshi Otsuka, Tokyo (JP); Yukako Yagi, Boston, MA (US)

(73) Assignee: The General Hospital Corporation, Boston, MA (US)

(*) Notice: Subject to any disclaimer, the term of this patent is extended or adjusted under 35 U.S.C. 154(b) by 763 days.

(21) Appl. No.: 13/233,786

(22) Filed: Sep. 15, 2011

(65) Prior Publication Data

US 2013/0071002 A1    Mar. 21, 2013

(51) Int. Cl.
G06K 9/00 (2006.01)
G01N 33/48 (2006.01)
G06T 7/00 (2006.01)

(52) U.S. Cl.
CPC ..... *G06T 7/0012* (2013.01); *G06T 2207/10056* (2013.01); *G06T 2207/30024* (2013.01)
USPC ............................... 382/128; 702/19; 702/22

(58) Field of Classification Search
None
See application file for complete search history.

(56) References Cited

U.S. PATENT DOCUMENTS

| | | | | |
|---|---|---|---|---|
| 6,665,430 B2* | 12/2003 | Reynolds et al. | ............ | 382/128 |
| 7,133,547 B2* | 11/2006 | Marcelpoil et al. | ............ | 382/129 |
| 7,171,030 B2* | 1/2007 | Foran et al. | ................ | 382/128 |
| 7,587,078 B2* | 9/2009 | Zahniser et al. | ............ | 382/133 |
| 7,657,070 B2* | 2/2010 | Lefebvre | ................ | 382/128 |
| 7,697,714 B2* | 4/2010 | Lapstun et al. | ............ | 382/100 |
| 7,764,831 B1 | 7/2010 | Pick et al. | | |
| 8,705,833 B2* | 4/2014 | Yagi et al. | ................ | 382/133 |
| 2004/0093166 A1* | 5/2004 | Kil | ................ | 702/19 |
| 2009/0231421 A1* | 9/2009 | Arai et al. | ................ | 348/79 |
| 2009/0245612 A1* | 10/2009 | Zahniser et al. | ............ | 382/133 |
| 2010/0128988 A1 | 5/2010 | Kincaid | | |
| 2010/0195903 A1* | 8/2010 | Tani | ................ | 382/162 |
| 2010/0201800 A1 | 8/2010 | Yamamoto et al. | | |
| 2010/0234052 A1* | 9/2010 | Lapstun et al. | ............ | 455/466 |
| 2010/0254589 A1* | 10/2010 | Gallagher | ................ | 382/133 |

(Continued)

FOREIGN PATENT DOCUMENTS

JP    2008185337    8/2008

OTHER PUBLICATIONS

"International Search Report for PCT/US2012/055316", mailed Feb. 25, 2013; by Commissioner of Korean Intellectual Property Office; pp. 1-10.

(Continued)

*Primary Examiner* — Manav Seth
(74) *Attorney, Agent, or Firm* — Yakov Sidorin; Quarles & Brady LLP (57) ABSTRACT

A system and method supporting medical diagnosis made based on evaluation of images of a histopathology sample. The method includes automated generation and evaluation of a digitally-stained image (emulating the effect produced on the sample by a chosen specific dye) based at least on one of data representing an image of the HE-stained sample and empirical testing data representing samples stained with specific dyes. The system is adapted to acquire a multispectral image of the sample, to implement the digital staining of the sample's image, and to evaluate automatically the digitally-stained image contemporaneously with multispectral image acquisition. The system generates an output indicative of need to request a preparation of an actual specimen stained with chosen specific dye for further evaluation, reducing the number of samples prepared in anticipation of such request and reducing time lapsed prior to the evaluation by a histopathologist.

10 Claims, 10 Drawing Sheets

(56) References Cited

U.S. PATENT DOCUMENTS

| | | | | |
|---|---|---|---|---|
| 2010/0271470 | A1* | 10/2010 | Stephan et al. | 348/77 |
| 2011/0109735 | A1 | 5/2011 | Otsuka | |
| 2011/0212486 | A1* | 9/2011 | Yamada et al. | 435/40.5 |
| 2011/0234812 | A1* | 9/2011 | Grunkin et al. | 348/187 |
| 2012/0269417 | A1* | 10/2012 | Bautista et al. | 382/133 |
| 2013/0044933 | A1* | 2/2013 | Kenny | 382/133 |
| 2013/0156279 | A1* | 6/2013 | Schoenmeyer et al. | 382/128 |
| 2014/0178874 | A1* | 6/2014 | Kuroda et al. | 435/6.11 |

OTHER PUBLICATIONS

Bautista, P.A. and Yagi, Y.: Localization of Eosinophilic Esophagitis from H&E Stained Images using Multispectral Imaging. Diagnostic Pathology. Mar. 30, 2011; 6 Suppl 1:S2. Available from www.diagnosticpathology.org/content/6/s1/s2.

Yagi, Y.: Color Standardization and Optimization in Whole Slide Imaging. Diagnostic Pathology, 201 Mar. 30; 6 Suppl 1:S15. Available from www.diagnosticpathology.org/content/6/s1/s15.

Bautista, P.A. and Yagi, Y.: Improving the Visualization and Detection of Tissue Folds in Whole Slide Images Through Color Enhancement. J Pathol Inform. Nov. 29, 2010; 1:25. Available from www.jpathinformatics.org/text.asp?2010/1/1/25/73320.

Bautista, P.A., et al.: Digital staining for multispectral images of pathological tissue specimens based on combined classification of spectral transmittance. Computerized Medical Imaging and Graphics. Dec. 2005;29(8):649-57.

Yamashiro, K., et al.: Comparison Between a Traditional Single Still Image and a Multiframe Video Image Along the z-Axis of the Same Microscopic Field of Interest in Cytology: Which Does Contribute to Telecytology? Diagnostic Cytopathology, Oct. 2009;37(10):727-31.

Weinstein, Ronald S., et al.: Overview of telepathology, virtual microscopy, and whole slide imaging: prospects for the future. Elsevier—Human Pathology. Aug. 2009;40(8):1057-69.

Ho, Jonhan, et al.: Use of whole slide imaging in surgical pathology quality assurance: design and pilot validation studies. Elsevier. Human Pathology. Mar. 2006;37(3):322-31.

Horbinski, Craig, et al.: Telepathology for Intraoperative Neuropathologic Consultations at an Academic Medical Center: A 5-Year Report. Neuropathol Exp Neurol. Aug. 2007;66(8):750-9.

Yagi, Yukako and Gilbertson, John R: Digital imaging in pathology: the case for standardization. Journal of Telemedicine and Telecare. 2005;11(3):109-16.

Bautista, P.A. and Yagi, Y.: Detection of tissue folds in whole slide images. Conf Proc IEEE Eng Med Biol Soc 2009:3669-72.

Yagi, Yukako and Gilbertson, John R: The importance of optical optimization in whole slide imaging (WSI) and digital pathology imaging. Diagnostic Pathology Jul. 15, 2008;3 Suppl 1:S1.

Yagi, Yukako and Gilbertson, John R: A relationship between slide quality and image quality in whole slide imaging (WSI). Diagnostic Pathology Jul. 15, 2008;3 Suppl 1:S12.

Gilbertson, John R. and Yagi, Yukako: Histology, imaging and new diagnostic work-flows in pathology. Diagnostic Pathology. Jul. 15, 2008;3 Suppl 1:S14.

Gilbertson, John R. et al.: Primary Histologic diagnosis using automated whole slide imaging: a validation study. BMC Clin Pathol. Apr. 27, 2006;6:4; available at www.BioMedCentral.com/1472-6890/6/4.

* cited by examiner

SYSTEM AND METHOD FOR SUPPORT OF MEDICAL DIAGNOSIS

TECHNICAL FIELD

The present invention relates generally to devices and methods for support of medical diagnosis that is based on assessment of morphological data representing a pathology sample and, in particular, to a method and system adapted to automate the evaluation of a conventionally-prepared sample and making a decision to proceed with preparation of an additional specifically-prepared sample, and to ensure that the pathologist's input into the evaluation and diagnosis is required only once.

BACKGROUND OF THE INVENTION

Abnormal or diseased biological tissues are often diagnosed and monitored with histopathology, for example, with histopathological assessment of a biopsy sample. The presence, concentration and distribution of biological molecules (such as nucleic acid, protein or lipids for example) or different portions and structures of the tissue can be determined by selecting a specific combination of chemical stains and fixatives. Visualization of the histological structures in a biological tissue sample is a basic procedure undertaken by a pathologist to reach a specific diagnosis on the disease that might have afflicted a patient, for example, kidney disease, liver disease, and the like. In particular, a pathologist assesses any variation in the morphological structures of the different components of the tissue, such as irregularities in shapes and sizes, and correlates the identified changes, if any, to a particular disease. Normally, a pathologist uses a physically stained tissue sample (a sample stained with a dye, for example) and relies on color cues to interpret texture and morphology of such tissue in arriving at his diagnosis. In comparison with an unstained tissue sample, in which histological structures are not clearly differentiated and which generally appears colorless when viewed under a microscope, a stained tissue specimen provides a clear illustration of the histological structures as well as vivid visual discrimination of the different tissue components. Various types of dyes are available to stain the tissue samples, each of the dyes labeling the histological structures with distinguishing colors thereby emphasizing the differences among such components. Choice of which type of stain to use depends mainly on what tissue structure is to be assessed in the diagnosis. Popular for routine staining are, for example, the hematoxylin and eosin (HE) dyes that facilitate differentiation between the nuclear region and the cytoplasm and connective tissues. Hematin (an oxidized form of hematoxylin) is a basophilic pigment having affinity to bound to a negatively-charged substance such as DNA of the cell's nucleus. As a result of treating the cell with hematoxylin, the cell's nucleus changes its color to purple-blue. Eosin, on the other hand, is an acidophilic pigment that binds to a positively-charged substance. Proteins contained in cytoplasm are colored in shades of red when stained with eosin.

Figure 1:
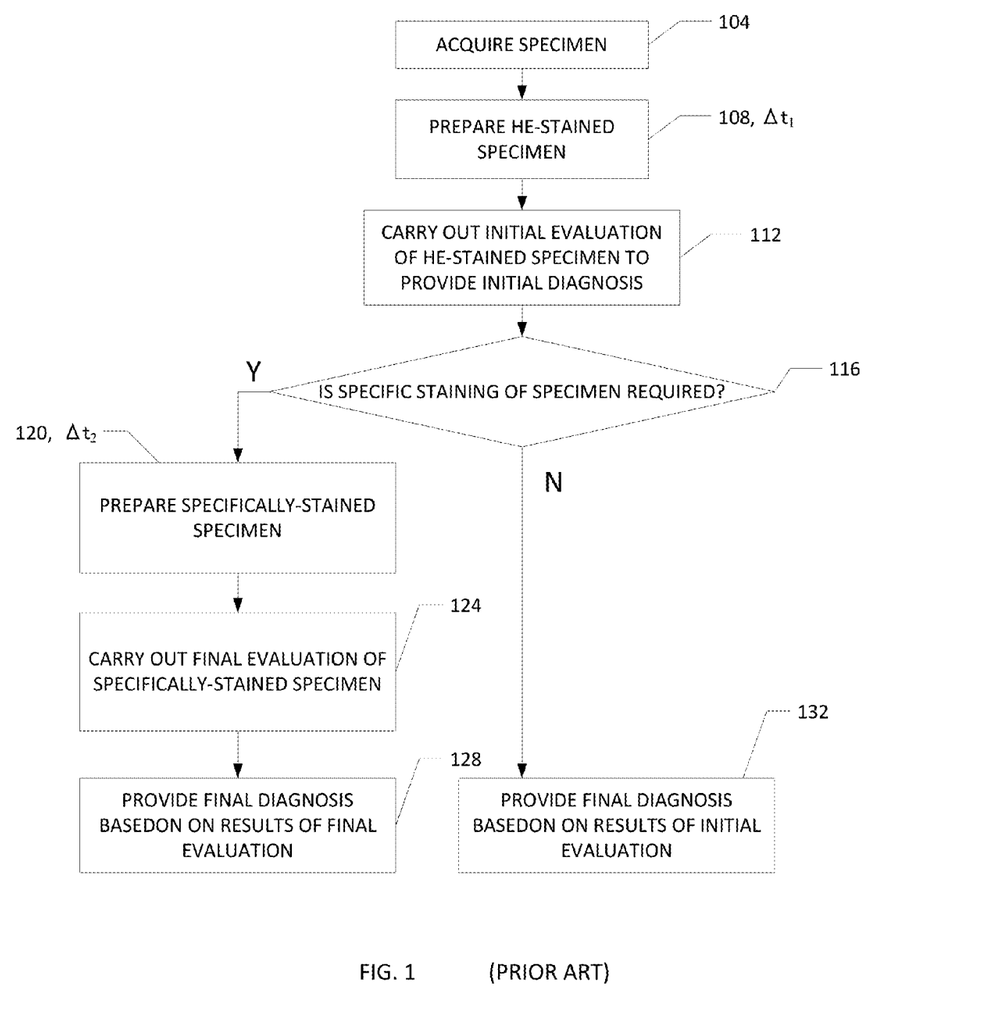
FIG. 1 is a flow-chart illustrating a conventional process of medical diagnosis based on evaluation of a histopathology sample.

A well-trained histopathologist can diagnose and grade the severity of a tissue disease based on color, shape, degree of staining, as well as pattern of a variety of stains. FIG. 1 illustrates schematically an example of the sequence of a conventionally-conducted pathological evaluation of a sample under test. In reference to FIG. 1, the initial diagnosis of the sample's condition is based on the evaluation of the HE-stained sample. As shown, the biological sample prepared at step 104 is subsequently stained with the HE dye at step 108. The staining procedure conventionally takes several days, depending on the available facilities (for example, $\Delta t_1$ between 1 and 3 days). The pathologist then evaluates the HE-stained sample, at step 112, to provide an initial diagnosis that may indicate a problem such as the presence of a lesion, for example. Such "positive" finding of a problem, once made, may prompt, at step 116, that an additional evaluation be required to localize the indicated problem (for example, to localize the targeted lesion in the sample). In this case, a specimen of the same biological tissue is prepared, at step 120, by staining the specimen with a so-called "specific" stain. The specific stain (such as Masson's trichrome stain, or MT; Victoria blue stain, or VB; or Ciemsa stain, for example) is appropriately chosen to cause chemical reaction(s) with the specific component(s) or compounds of the cell (such as enzymes, polysaccharides, lipids, metals, and ions, for example) that facilitate(s) the localization of the targeted problematic substance. The preparation of a specifically-stained sample takes several days more. Consequently, another, final evaluation step 124—the evaluation of the specifically-stained sample—is carried out by a histopathologist several days (for example, $\Delta t_2=1$ to 3 days) later, bringing with it, at step 128, a final diagnosis about the condition of the patient. However, if the additional evaluation is not required, the final diagnosis can be made, at step 132, on the basis of the initial evaluation.

It is appreciated, therefore, that the process of diagnosis of the patient's condition may require multiple days. The longer the overall time, $\Delta t_1 + \Delta t_2$, needed to arrive at the final diagnosis (step 128), the more the patient is likely to be physically and mentally burdened. As the related art indicates, the desire to reduce the delay in diagnosis process prompted the preparation of both the HE-stained sample and the specifically-stained sample(s) ahead of the initial evaluation, and sometimes regardless of what specific staining may or may not be necessary. While by doing so the histopathologist has an option of using the required specifically-stained sample(s) immediately following the decision step 116, the anticipatory preparation of the specifically-stained sample(s) is problematic and costly as it leads to unnecessary waste of samples, staining effort, and time of the histopathology technician. Consequently, there remains a problem of reducing time required to arriving at the ultimate diagnosis of the condition of the specimen.

SUMMARY OF THE INVENTION

Embodiments of the invention provide an image-evaluation apparatus configured to support a process of medical diagnosis based on automated evaluation of an image of a biological sample. An embodiment of such apparatus comprises an optical system adapted to acquire imaging data representing a biological sample and a processor that is programmed to effectuate an operation of the apparatus. In particular, the processor is programmed to receive the acquired imaging data from an input, to cause generation of a first visually-perceivable representation of a reaction of the biological sample to a first chosen dye, and to cause generation of a first user-perceivable output representing a request to stain the biological sample with the first chosen dye. In one embodiment, the processor is additionally adapted to cause generation of an image representing a change of an optical characteristic of the biological sample in response to the biological sample's being exposed to the first chosen dye, and to generate a first index associated with a ratio of a first area of said image representing a change of said optical characteristic to the overall area of the image. In one embodiment, the apparatus additionally contains a tangible computer-usable memory storage, and the processor is adapted to cause generation of the first user-perceivable output based at least on comparison of the first index with a first threshold value that has been estimated using training data stored at the memory storage. In a related embodiment, the apparatus further comprises a display device operably connected to the processor and configured to exhibit at least one of an image corresponding to the acquired imaging data and an image representing a change of an optical characteristic of the biological sample in reaction to exposure to the first chosen dye. Alternatively or in addition, the apparatus contains a display device configured to exhibit the first visually-perceivable representation; and an electronic circuitry in electrical communication with the processor, and the processor is additionally adapted to cause the electronic circuitry to generate a signal representing a request to stain the biological sample with the first chosen dye in response to a user input applied to the display device. In a specific embodiment, the display device is controlled by said processor that is additionally adapted (i) to cause generation of a second visually-perceivable representation of a reaction of the biological sample to a second chosen dye, and (ii) to case generation of a user-perceivable output representing a priority of need to stain the biological sample with the first and second chosen dyes, and where the priority of need is determined based at least on comparison of indices assigned to first and second visually-perceivable representations.

Embodiments of the invention also provide a medical diagnosis support system that includes an input, configured to acquire input data representing a type of biological tissue and a tentative medical condition of said biological tissue; a processor, operably connected to the input and adapted to identify a specific dye based at least on the acquired input data and training data; and an optical system, adapted to acquire a multispectral image of the biological tissue that has been stained with a first dye. An embodiment of the medical diagnosis support system additionally includes a first data-processing device configured to receive the image data corresponding to the acquired multispectral image and to transform the acquired multispectral image to a virtually-stained image emulating a spectral response of the tissue to staining with the identified specific dye. An embodiment further contains a second data-processing device adapted to generate an output based at least on comparison of the virtually-stained image data and the training data, which output represents a priority request to stain the tissue sample with the specific dye. Furthermore, system includes a user interface (UI), in communication with at least one of the first and second data-processing devices, that is configured to display at least one of the multispectral image, virtually-stained image, and said generated output, and that is further configured to receive a user input predicated on said generated output.

Additionally, embodiments of the invention provide a method for controlling the operation of a computer-assisted system for evaluation of a pathological condition of a biological tissue. This method includes digitally creating spectral transmission data that represents a spectral response of the tissue to a specific dye; automatically comparing the digitally-created spectral transmission data to training data to determine a figure of merit representing a specified pathological condition of the tissue; and, based on the determined figure of merit, requesting a sample of the tissue stained with a specific dye. In one embodiment, digitally creating spectral transmission data includes digitally creating at least two sets of spectral transmission data; automatically evaluating includes a determination of a least two figures of merit respectively corresponding to the at least two sets of spectral transmission data; and requesting a sample includes requesting at least two samples in order of corresponding priority ratings defined by the at least two figures of merit. In a related embodiment, the method additionally includes at least one of converting the digitally created spectral transmission data into an RGB color space and presenting an image corresponding to so converted spectral transmission data for visualization.

In a related embodiment, the method may include acquiring spectral transmission data that represents a tissue sample stained with an original dye such as, for ex ample, an HE dye. The process of digitally creating spectral transmission data may include mapping the acquired spectral transmission data, based on training data associated with said tissue and said specific dye, into modified spectral transmission data. In a specific embodiment, alternatively or in addition, an act of requesting a sample based on the determined figure of merit includes requesting a sample when the determined figure of merit is no less than a threshold value defined by the training data.

DETAILED DESCRIPTION OF SPECIFIC EMBODIMENTS

Embodiments of the present invention are directed to facilitate the reduction of the number of specifically-stained pathology samples prepared in anticipation of specimen evaluation required for a medical diagnosis. Embodiment are additionally directed to shorten time spent prior to the histopathologist's making a single diagnostic evaluation of the specifically-stained specimen, on the basis of which the ultimate diagnosis is made.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and/or in reference to a figure, is intended to provide a complete description of all features of the invention.

In addition, in drawings, with reference to which the following disclosure may describe features of the invention, like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and not all, features of the invention. A given drawing and an associated portion of the disclosure containing a description referencing such drawing do not, generally, contain all elements of a particular view or all features that can be presented is this view in order to simplify the given drawing and the discussion, and to direct the discussion to particular elements that are featured in this drawing.

A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described features, structures, or characteristics of the invention may be combined in any suitable manner in one or more embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The invention as recited in claims appended to this disclosure is intended to be assessed in light of the disclosure as a whole.

Recently, digital technology has been developed to digitally "stain" images. Digital staining of an image is understood as the process of digitally converting the original image into an image with visual characteristics mimicking those that would be observed if the tissue were to be stained with a dye conventionally. As is the case with many traditional clinical applications that are advanced with digital technology, the advantages of digital staining are multifold. For example, digital staining provides a quantitative result, which could aid diagnosis and reduce the hands-on time of a trained histopathologist as well as reduce intra-histologist variation in diagnosis. It offers the opportunity to develop a variety of digital staining procedures and has the potential to be significantly cheaper than existing chemical staining techniques. Moreover, digital staining does not destroy the biological sample and therefore the same sample could be analyzed by multiple digital staining protocols. Finally, the digital staining process does not involve toxic chemical stains, and is, therefore, intrinsically harmless to the user. Specific digital-staining processes do not change embodiments of the present invention and, for that reason, are not discussed in this application.

According to embodiments of the present invention, a length of time conventionally required prior to making a secondary diagnosis is shortened by skipping the unnecessarily preparation if specifically-stained biological sample(s) and enabling a histopathologist to make an initial evaluation of the information pertaining to the sample under test to be final. The idea of the invention stems from the realization that a determination of whether the preparation of a specifically-stained pathological specimen is required can be made automatically and based on the automated evaluation of a digitally-stained image, as opposed to the evaluation of an actually (physically) stained sample by a histopathologist. In other words, and in contradistinction with the algorithms of FIG. 1, both the initial diagnosis of step 112 and the determination of step 116 are procured automatically, without involving the clinician and without pre-staining the target sample thereby effectively skipping the steps of the initial evaluation of the sample by the clinician. Consequently, the amount of time $\Delta t_2$ is reduced substantially to zero, and only time when the clinician is involved in the process of evaluation and diagnostic is the single evaluation of the image of the sample that has been specifically-stained in response to a system-made decision to specifically-stain the sample. As a result, the duration of the overall diagnostic process of an embodiment of the invention is significantly reduced as compared to the conventionally-used diagnostic methods.

Figure 2:
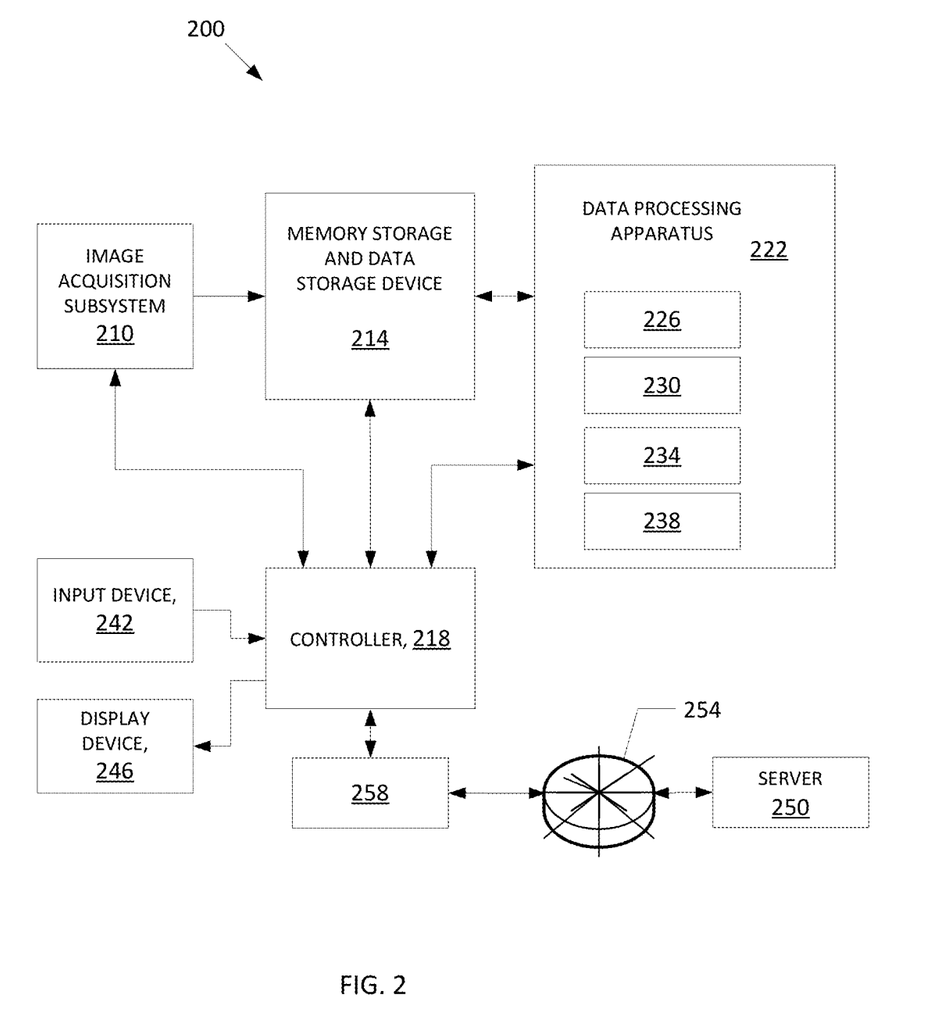
FIG. 2 is a block-scheme illustrating an embodiment of a system of the present invention.

FIG. 2 illustrates schematically an embodiment 200 of a medical-diagnosis support system adapted to implement the diagnostic method of the invention. The embodiment 200 includes an image-acquisition sub-system 210 that is configured to register an image of the biological sample of interest and to pass the image data to a non-transient tangible memory storage 214, which is operably connected to the image-acquisition sub-system 210. The memory storage 214 contains tangible computer-usable memory storage including at least one of the memory-storage types known in the art such as, for example, a semiconductor memory device (e.g., RAM, ROM, PROM, EEPROM, or Flash-Programmable RAM), a magnetic memory device (e.g., a diskette or fixed disk), an optical memory device (e.g., a CD-ROM), an PC card (e.g., PCM-CIA card).

The embodiment 200 additionally includes a controller 218 (such as a computer processor, for example) in operable communication with the image-acquisition sub-system 210 and the memory storage device 214. The controller 218 is programmable to control the operation of the image-acquisition sub-system 210 and to effectuate data-transfer from and to the memory storage 214. The controller 218 is additionally configured to implement image-data processing operations that include, but are not limited to, the transformation of an image of the pathological sample acquired with the image-acquisition sub-system 210. In one embodiment, such image transformation is achieved by changing at least one of optical characteristics, such as spectral content, of the acquired image via virtual (digital) staining of the acquired image. The image-processing operations additionally include the determination of a necessity to actually (physically) stain the pathological specimen with at least one type of stain corresponding to the virtually-stained image. Such a determination is made based, at least in part, on the virtually- (or digitally-) stained image created by the system 200.

Accordingly, the controller 218 is adapted to be programmable (via a computer-program product that includes a computer-usable tangible medium having computer-readable program code thereon) to establish, as part of the embodiment 200, the computer-implemented data-processing apparatus 222 including an image virtual-staining device 226 and a staining-necessity resolving device 230. The computer-implemented apparatus 222 also contains a display-order determining device 234 and a specimen requestor 238 that will be discussed below.

In further reference to FIG. 2, the controller 218 is operably cooperated with an input device 242 that is configured to generate an instruction for and to pass it on to the controller 218 in response to an external input (such as the user input) that has been registered by the input device 242. In one embodiment, the input device 242 includes at least one of a keyboard, a computer mouse, a touch panel, and a switch. The embodiment 200 further includes a controller-driven display device 246 such as, for example, an LCD device, an electroluminescent (EL) display device, or a CRT-based display device that is adapted to present optical images for visualization and evaluation. Devices and sub-systems of the embodiment 200 are further configured to communicate, to and fro, with a local (or, alternatively, distantly located) medical diagnosis support server 250 that is, generally, connected with the controller 218 via the network 254 and a communication sub-system 258.

Further description pertaining to the embodiment 200 is provided below in reference to FIGS. 3 through 6.

Figure 3A:
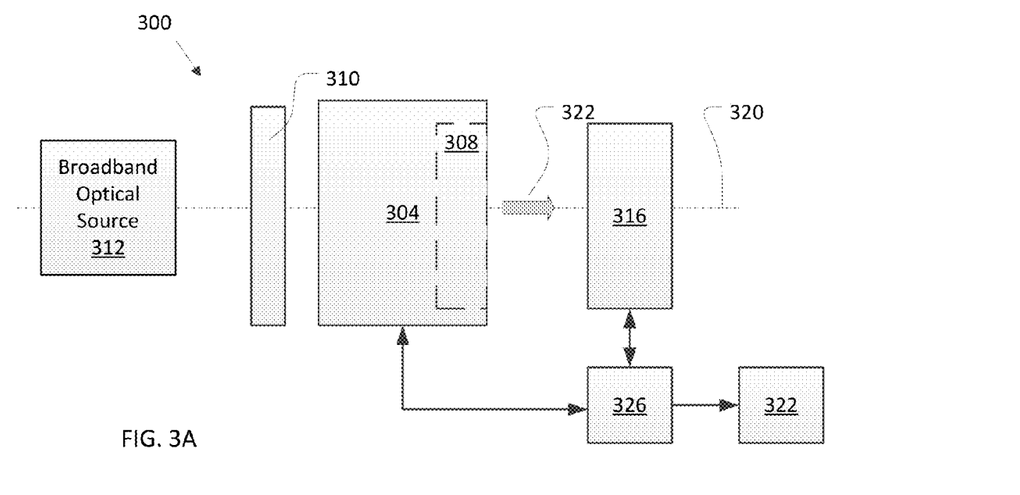
FIGS. 3A and 3B are illustrations of generalized embodiments of an image-acquisition systems for use with embodiments of the present invention.

FIGS. 3A and 3B illustrate two general types 300 and 350 of a multispectral imaging (MSI) system that can be used with the embodiment 200 of FIG. 2. MSI equips the analysis of pathology samples with computerized microscope-based imaging system by providing access to spectral distribution of an image at a pixel level. While numerous multispectral imaging systems exist, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instrument(s) capable of selecting a pre-determined spectral component including electromagnetic radiation at wavelengths beyond the range of visible light range, such as, for example, infrared (IR). In comparison with panchromatic imaging, the plurality of color channels of a standard MSI system typically represents only a small subspace of the available spectral data. FIG. 3A shows an apparatus 300 including an optical imaging system 304, a portion 308 of which contains a spectrally-selective system that is tunable to define a pre-determined number N of discrete optical bands. The optical system 304 is adapted to image a tissue sample 310, illuminated in transmission with a broadband light source 312 onto an optical detector 316. As shown, the optical imaging system 304, which in one embodiment may include a magnifying system such as, for example, a microscope, has a single optical axis 320 generally spatially aligned with a single optical output 322 of the optical system 304. The system 304 forms a sequence of images of the tissue 310 as the spectrally-selective system 308 is being adjusted or tuned (for example with a computer processor 326) such as to assure that images are acquired in different discrete spectral bands. The apparatus 300 may additionally contain a display 322 in which appears at least one visually-perceivable image of the tissue from the sequence of acquired images. The spectrally-selective system 308 may include an optically-dispersive element such as a diffractive grating, a collection of optical filters such as thin-film interference filters or any other system adapted to select, in response to either a user input or a command of the pre-programmed processor 326, a particular pass-band from the spectrum of light transmitted from the light source 312 through the sample 310 towards the detector 316.

Figure 3B:
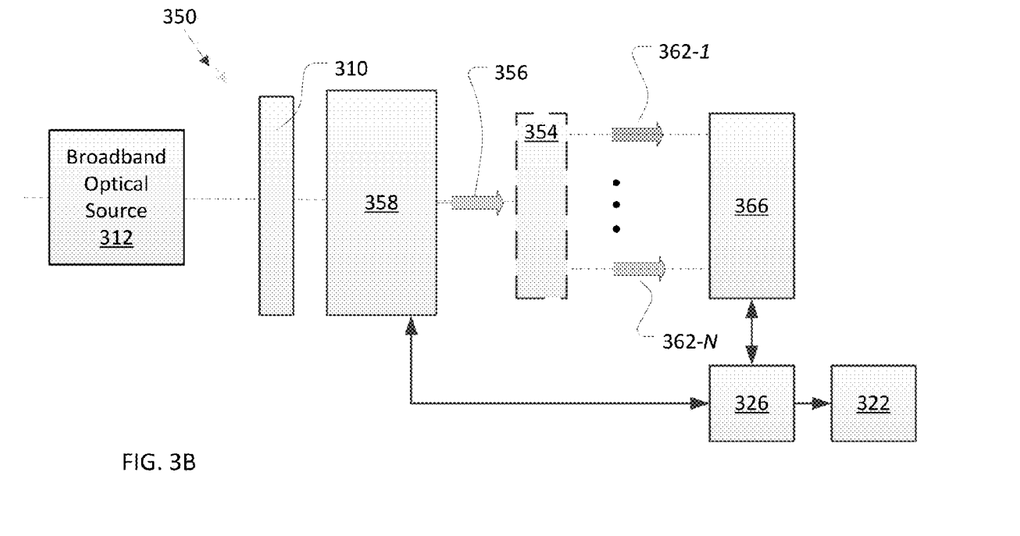

An alternative implementation 350 of an apparatus adapted to simultaneously take a multiplicity of spectrally-discrete optical images in several spectral bands is shown in FIG. 3B. Here, the spectrally-selective system 354 defines several optical outputs corresponding to N discrete spectral bands. The system 354 intakes the transmitted light output 356 from the optical system 358 and spatially redirects at least a portion of this light output along N spatially different optical paths 362-1 through 362-N in such a way as to image the sample 310 in an identified spectral band onto a detector system 366 along an optical path corresponding to this identified spectral band. It is appreciated that another alternative embodiment (not shown) may combine features of the embodiments 300 and 350.

Example of Image Acquisition.

Figure 4:
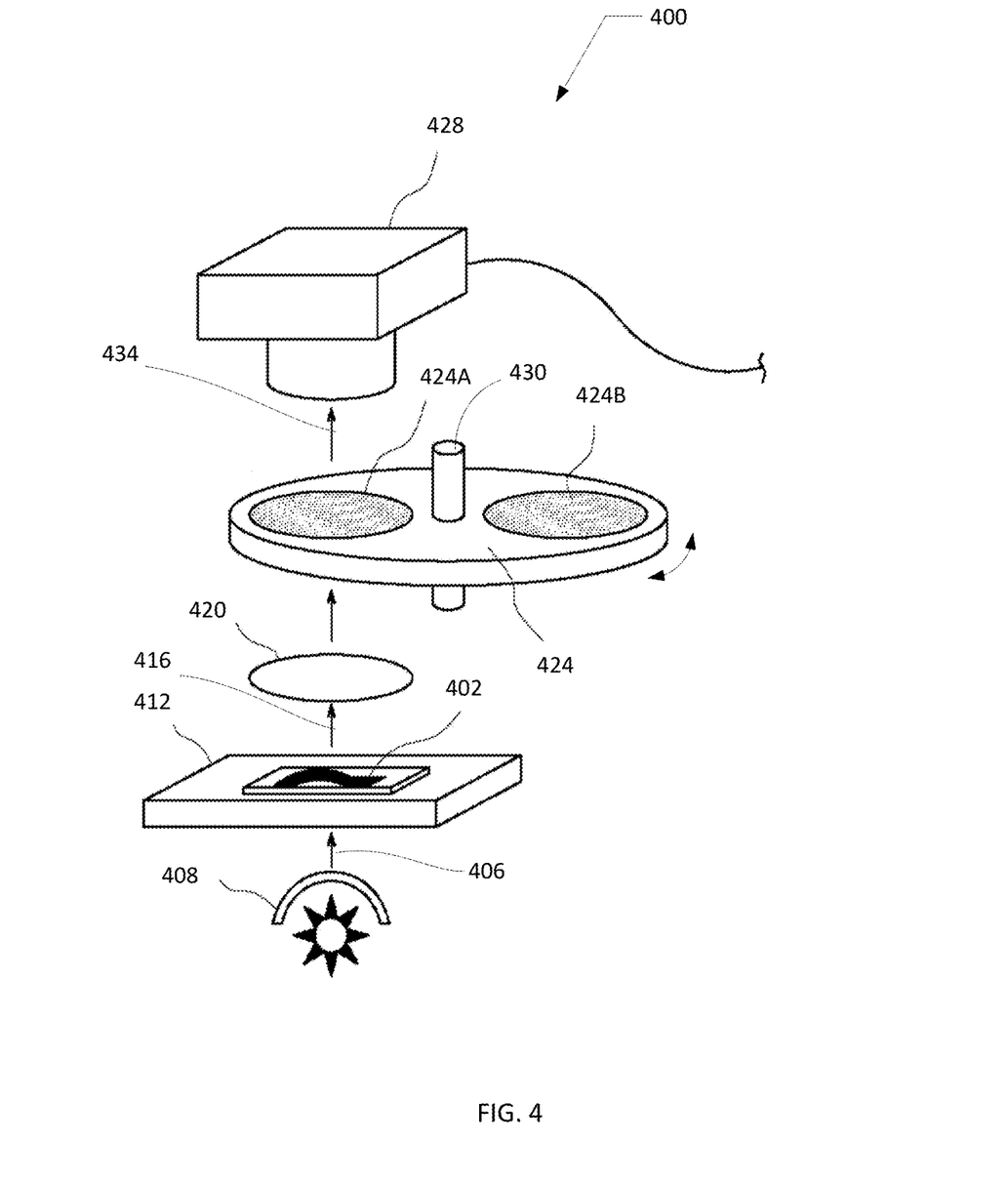
FIG. 4 shows a specific implementation of the image-acquisition sub-system of the embodiment of FIG. 2.

FIG. 4 shows a specific embodiment of a magnifying imaging system 400 with the use of which the multispectral images of a biological sample 402 were captured. The magnifying imaging system 400 included an illumination component 408 adapted to produce light 406 such as to illuminate the sample 402 placed on a repositionable light-transmitting support stage 412. Light 416 that has passed through the sample 402 was further imaged, by an imaging optic 420, through a spectrally-selective system 424 onto an imaging camera 428. As shown in FIG. 4, the imaging optic 420 included a lens. Generally, however, the imaging optic may alternatively or in addition include a reflective optical component such as, for example, a mirror element.

Figure 5A:
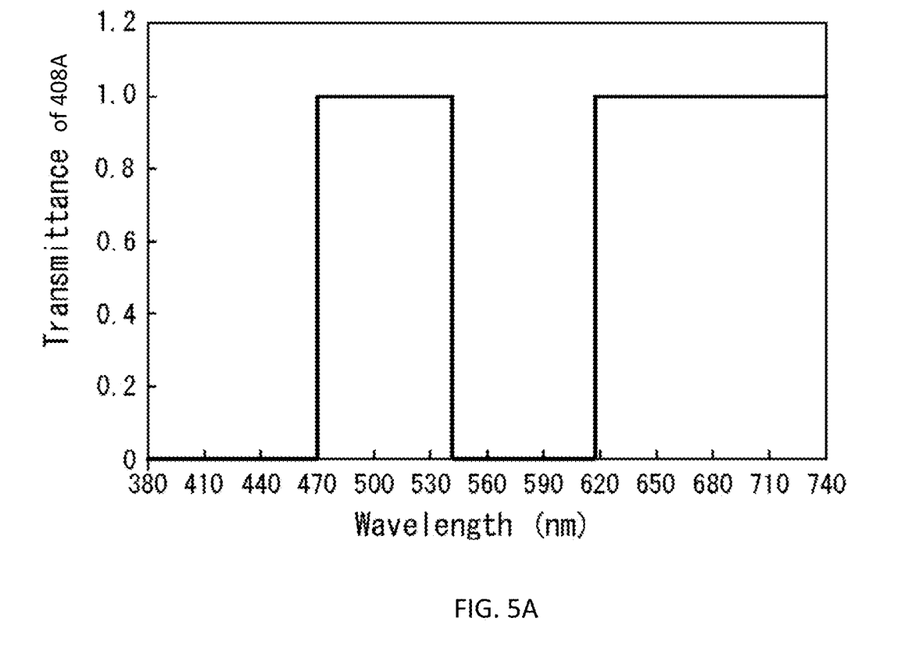
FIGS. 5A and 5B are graphs of spectral transmission characteristics of specific embodiments of optical filters for use with the image-acquisition sub-system of FIG. 4.
Figure 5B:
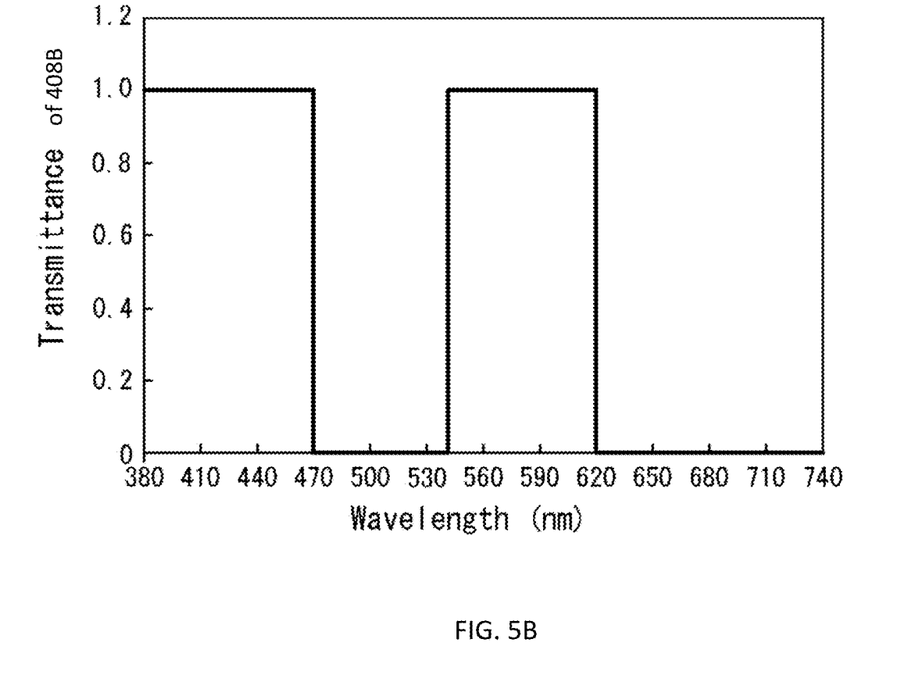
Figure 6:
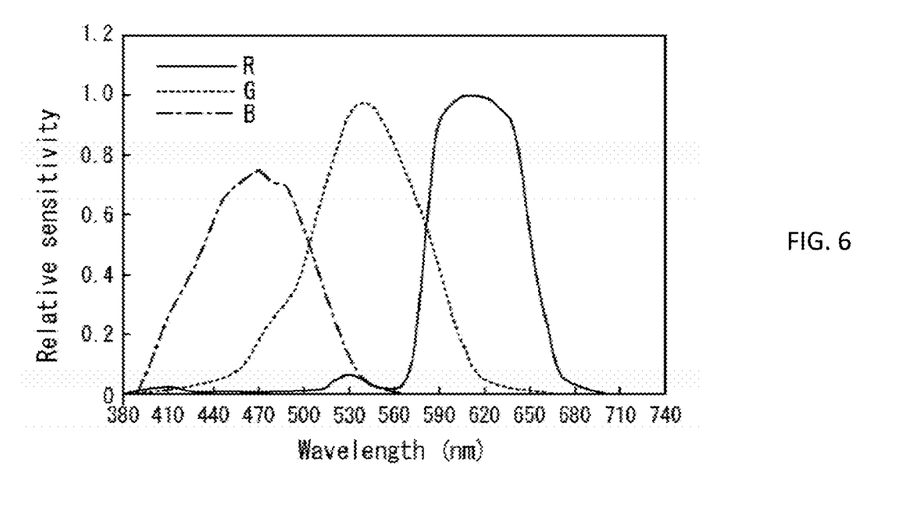
FIG. 6 is a graph illustrating the spectral sensitivity characteristic of a tri-band (RGB) camera of the embodiment of FIG. 4.

The rotatable around an axis 430 spectrally-selective system 424 included optical filter elements 424A, 424B, the spectrally-complementary transmission characteristics of which aggregately spun the visible spectrum region and are shown in FIGS. 5A, 5B, respectively. As shown, the pass-bands of the optical filter element 424A coincided spectrally with the stop-bands of the optical filter element 424B, and vice versa. The camera 428 included an optical detector (not shown) such as a CCD device or a CMOS device that possessed spectral sensitivity in red (R), green (G), and blue (B) spectral bands, as illustrated in FIG. 6. It is appreciated, therefore, that the spectral content of imaging light 434 incident onto the camera 428 was defined by a product of the transmission characteristic of a used filter system (424A or 424B) and the sensitivity characteristic of the optical detector of the camera 428.

In further reference to FIGS. 2 and 4, in operation, the pre-programmed controller 218 initially caused the rotation of the spectrally-selective system 424 about the axis 430 until one of the filters of the system 424 (for example, the filter 424A) intersected the beam of light transmitted from the sample 402 through the optic 420. The controller 218 further operated a video-grabbing electronic circuitry (not shown) and caused the image-data, acquired with the camera 428, to be stored at the memory storage device 214 for future processing. Following the acquisition of an image of the sample 402 in the spectral domain defined by the optical characteristic of the filter 424A (shown in FIG. 5A) and that of the camera 428 (shown in FIG. 6), the controller 218 caused a repositioning of the system 424 to ensure that the imaging light 416 passed through another filter (for example, the filter 424B) and that another multispectral image of the sample 402 was registered with the camera 428 and stored at the storage device 214. Aggregately, therefore, the embodiment 400 of the image-acquisition sub-system of the invention was adapted to acquire images in N=6 spectral configurations. Generally, however, a different number of spectral channels may be employed in an MSI system of choice and a possible extension of the filter spectral range to the near infrared (NIR) portion of the spectrum is considered to be within the scope of the invention. Alternatively, the image-acquisition sub-system 210 may be structured to omit the spectrally-selective system 424 altogether and obtain image data only in spectral bands characterizing the camera (R, G, and B bands in the case of camera 428).

Figure 7:
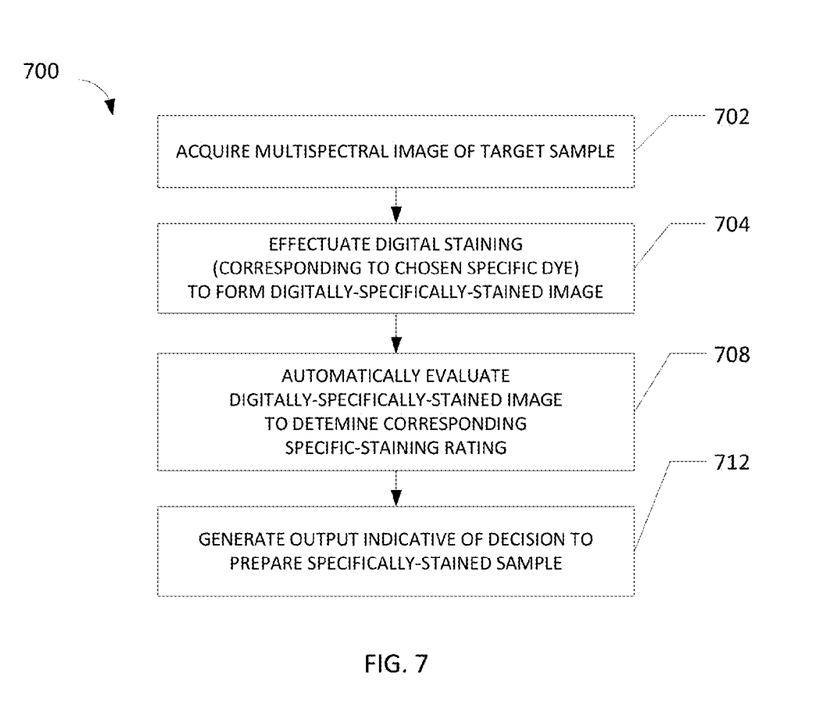
FIG. 7 is a flow-chart illustrating steps of operation of the embodiment of FIG. 2.

FIG. 7 illustrates an example of steps of operation of the embodiment 200 of FIG. 2 driven by the controller 218 that has been pre-programmed with a program code loaded into the memory storage device 214. In one implementation, following the preparation of the HE-stained target sample of interest, acquisition of a multispectral image of this sample under test, and storing the corresponding image on the data storage device 214 at step 702, the controller 218 activates the computer-implemented virtual-staining device 226 to create, at step 704, a digitally-stained image of a sample based on the acquired multispectral image, the type of tissue, and the type of disease that the sample has been qualified with at the stage of preliminary diagnosis. In one embodiment, the virtual (digital) staining of the specimen-image is carried out according to the image-processing method disclosed in JP 2010-025758.

Following the creation of a digitally-stained image, the controller 218 causes the staining-necessity determining device 230 to process the image data corresponding to the digitally-stained image and to calculate, at step 708, a figure of merit or index representing a specific-staining rating R corresponding to the digitally-stained image. The figure of merit is based on image data representing such change of optical characteristics of a sample in response to digital staining that is indicative of the presence of the pathological disease. Based at least in part on the calculated rating R, the embodiment 200 then produces an output, at step 712, indicating to the user (for example, histopathologist) whether or not an actual specifically-stained biological sample has to be prepared and evaluated by a histopathologist in order to complete the medical diagnosis process. The general algorithm of the method of the invention is discussed in detail in reference to FIG. 9.

In a specific embodiment and in further reference to FIG. 7, the system makes an automated determination of whether the carried out digital staining of the sample is sufficient for ultimate diagnosis or an actual staining of the sample with specific dye is required. Specifically, data representing the digitally-stained image of step 704 are processed to determine the specific-staining rating according to $$R = \frac{\Sigma_x \Sigma_y \text{ stained pixels}}{\Sigma_x \Sigma_y 1} \qquad \text{Eq. (1)}$$

Eq. (1) defines a ratio of a sum of all pixels in an image at hand that correspond to a stained portion of the tissue to the total number of image pixels representing the tissue. Thereafter, the value of the specific-staining rating R is compared with a predetermined specific-staining reference (threshold rating value) $R_{TH}$. The threshold rating value is defined for a given type of tissue and a given specific dye based on empirically-collected training data (stored, for example, at the server 250 of FIG. 2), that represents changes in optical characteristics of numerous types of biological specimen having various diseases to different specific dyes. When the rating R is equal to or exceeds $R_{TH}$, the computer-implemented staining-necessity determination device 230 produces an output such as, for example, a visual indicator delivered to the display device 246 that notifies the user that a specific staining of the specimen with a corresponding specific dye is required. In a related embodiment (not shown), such output may be aural and delivered to the user through an appropriately configured audio subsystem (not shown). Alternatively, when the value of $R_{TH}$ exceeds that of the rating R, no preparation of the specifically-stained specimen is requested.

Figure 9:
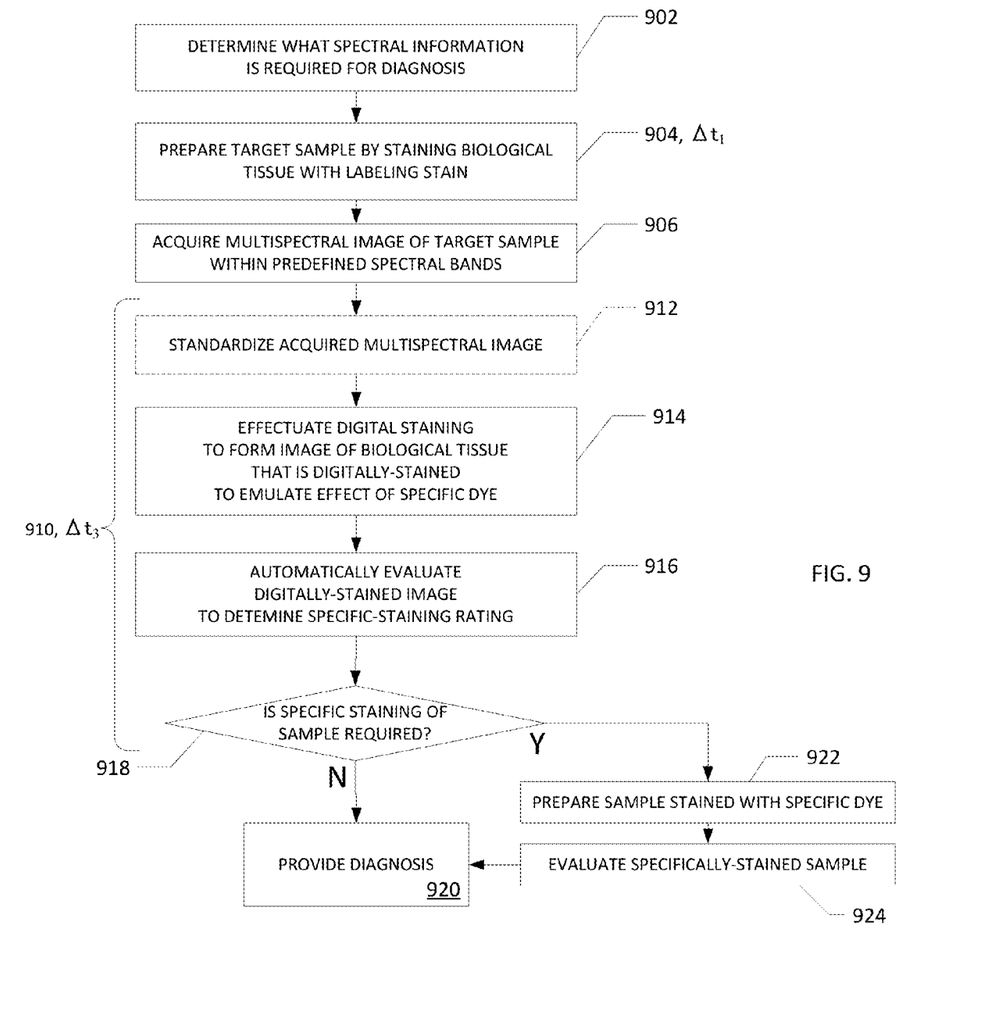
FIG. 9 is a flow-chart illustrating a medical evaluation and diagnosis algorithm according to an embodiment of the present invention.

More general description of a computer-assisted medical evaluation and diagnostic algorithm of the invention is now discussed in reference to FIG. 9. FIG. 9 is a flow-chart representing an embodiment of the medical evaluation and diagnostic process that includes evaluation of the spectral data corresponding to a sample stained with at least one specific dye when the evaluation of the sample stained with a standard dye (such as the HE-dye) may not be sufficient for the ultimate diagnosis. The discussed below example of the process is carried out based at least in part on automated evaluation of the digitally-stained images of the biological sample under test. The algorithm of FIG. 9 starts at a preparatory step 902, when a system of the invention identifies the type of spectral data that is required for evaluation of a pathology sample, based on the data input (not shown) representing at least the type of biological tissue under test and the preliminary clinical diagnosis (i.e., a type of disease that is thought to have affected the tissue). Suppose that the sample under test includes a liver biopsy sample and that the preliminary clinical diagnosis indicated sclerosis of the liver. In light of empirically collected training data, the computer-controlled system derives that, given these initial data, further evaluation of the liver sample requires spectral response of the livers sample to staining with a certain standard dye (for example, with the HE-dye) and, optionally, that to staining with a certain specific dye (for example, the MT dye). Such derivation amounts to a determination of which type(s) of sample-staining may be required and, accordingly, in which spectral band(s) the image data represented such stained sample should be collected.

According to such derivation, the preparation of a target sample by staining the biological specimen of interest with the standard dye (in this case, staining a liver biopsy specimen with the HE-dye) is carried out at step 904. The prepared target sample is further imaged at step 906 within the spectral bands determined at step 902. Such image data acquisition is effectuated with the use of the image-acquisition portion of the system of the invention, such as, for example, the embodiment 400 of the image-acquisition system shown in FIG. 4.

The collected image data is further used for computer-assisted diagnostic procedures 910, the duration of which $\Delta t_3$ is substantially equal to time required for computer-processing of related data.

As part of computer-assisted diagnostic procedures, an image of the target sample may be optionally transformed by, for example, scaling (multiplying by corresponding coefficient(s)) the values of imaging data points representing the stained portions of the sample when such stained portions do not appear sufficiently colored or distinguished in the acquired image. In one embodiment, the optional scaling coefficients are defined in reference to predetermined values of image intensity chosen to respectively correspond to various morphological features of standard biological tissues. The optional implementation of such image modification or standardization ensures that the otherwise excessive (or, alternatively, insufficient) degree of sample staining is compensated digitally, at the post-acquisition stage, such that images of the samples of the same type taken at different times have somewhat comparable appearance. For example, as shown by the dashed line of the block representing step 912 of FIG. 9, the multispectral image of the target sample acquired at step 906 can be enhanced to have standardized color density.

Based at least in part on the acquired image of the target (HE-stained) sample, at step 914 at least one digitally-stained image is formed, which emulates the effect(s) of the specific dye(s), determined at step 902, on the biological sample under test. The purpose of emulating the effect(s) of the specific staining is to visually enhance the tissue components that are affected by the disease specified at the step of initial clinical diagnosis (not shown) and that are not sufficiently distinguishable in the image of the HE-stained sample. For example, in the abovementioned example of a liver biopsy sample, an image of the sample that is digitally-stained with the MT-dye is required to visibly identify portions of the sample containing fibers such as collagen fibers, for example.

The computer-assisted evaluation of the digitally-stained image(s) at step 916 produces a specific-staining rating or score value associated with the evaluated digitally-stained image. In one embodiment, the score or rating is a number representing a ratio of the area of the imaged tissue affected by the malady specified at the step of preliminary clinical diagnosis. For example, the staining-necessity resolving device 230 calculates the number of pixels of the tissue-portion of the digitally-stained image that exhibit the same spectral characteristics as those that are affected by the disease specified at the initial clinical diagnosis. In another embodiment, the score or rating represents a number of discrete components or elements of the tissue that exhibit such spectral characteristics. For example, if it is the nuclei of the cells that are susceptible to the specified disease, the input representing the need in evaluating the nuclei in an image is provided to a system at step 902 and the staining-necessity resolving device 230 detects and counts the number of nuclei, as present in the digitally-stained image, that have spectral characteristics representing the specified disease as a response to being digitally stained.

Generally, the system offers the determined rating or score to the histopathologist who, based on the score, decides at step 918 whether an actual, physically stained with a specific dye sample of tissue is required to arrive at ultimate diagnosis. For example, when, as a result of computer-assisted diagnosis, the system arrived at a specific score value, the histopathologist may decide that the score value is such that he or she needs only an evaluation of the HE-stained sample prepared at step 904. In this case, the histopathologist provides an ultimate diagnosis at step 920 based on evaluation of the HE-stained sample. In another example, when the value of the rating/score is significantly low (which may be indicative not only of the absence of the disease but also of an unsuccessful generation of the digitally stained image by the system), the histopathologist may decide that a repetition of step 914 may be required or, alternatively, that an actual sample stained with the specific dye should be prepared at step 922 and evaluated at step 924. Therefore, the histopathologist makes a diagnosis based on evaluation of the actual stained sample, at step 920.

In a specific embodiment, and as discussed in reference to FIG. 7, the system is configured not only to produce a specific-staining rating at step 916 but also to generate an automated decision offered to the histopathologist. (One example of such situation is when specific dye(s) allocated for staining the sample, whether physically or digitally, include immunochemical materials that facilitate recognition of cancerous tissue). In this case, based on the comparison of the determined specifically-stained rating with the threshold rating value (which corresponds to the chosen specific dye and which is determined based on pre-stored training data), the automated decision is made, at step 918, of whether the preparation of the sample stained with the chosen specific dye is required for further evaluation and diagnosis. If such staining is prescribed by the system at step 918, the specifically-stained sample is prepared at step 922 and further evaluated at step 924 by a histopathologist, who arrives at the diagnosis (step 920). However, if no preparation and evaluation of a specifically-stained sample is required, the histopathologist provides the diagnosis, at step 920, by evaluating the multispectral image of the HE-stained sample acquired at step 904.

A conventionally-conducted medical diagnosis process, shown in FIG. 1, dictates that a histopathologist intervene twice: first, at a stage of evaluation of the image of the HE-stained sample; and second, at a stage of evaluation of the specifically-stained sample. Moreover, the conventionally-conducted process of FIG. 1 implies that the preparation of specifically-stained sample(s) be preceded by the user's decision to do so, made on the basis of evaluation of the image of the HE-stained sample. In contradistinction with the conventional approach, embodiments of the invention such as, for example, the embodiment of FIGS. 2 and 9, eliminate the histopathologist's input at the stages leading to and including the stage of making a decision of whether the preparation of specifically-stained sample(s) is required. Specifically, a subsequence 910 of the process of FIG. 9 is performed in an automated, computer-assisted fashion without the histopathologist's input and takes substantially no time besides the data-processing time $\Delta t_3$. Consequently, embodiments of the invention facilitate significantly shortened duration of the overall diagnostic process ($\Delta t_1 + \Delta t_3 \approx \Delta t_1$), which requires only a single evaluation of an image by the histopathologist, at step 920.

Figure 8A:
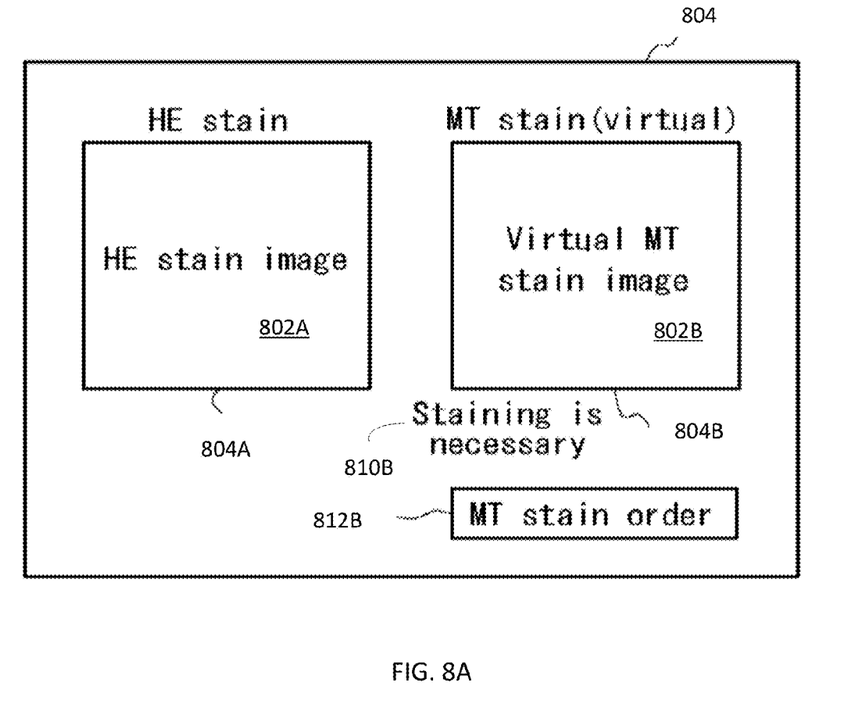
FIGS. 8A, 8B are embodiments of a display device with indicators of a single request for a specifically-stained sample.
Figure 8B:
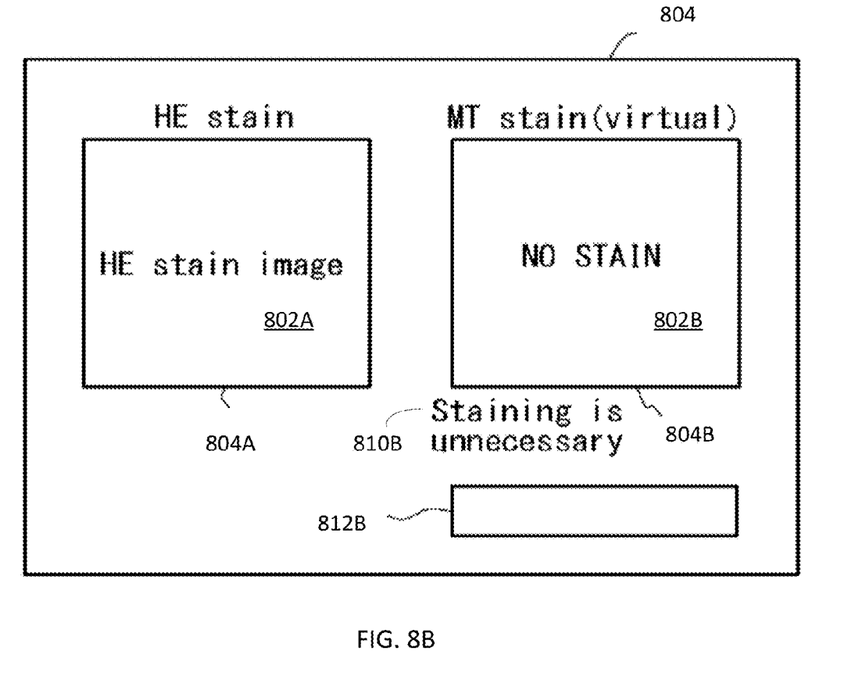

A display portion of the specific embodiment of the system of the invention is illustrated in FIGS. 8A and 8B and in further reference to FIGS. 2, 7, and 9. In response to the output produced by the staining-necessity resolving device 230 at step 712 of the embodiment of the data-processing algorithm, the controller 218 causes the display device 246 to exhibit an image 802A (denoted with the "HE stain image") of the HE-stained target sample in a corresponding portion 804A of a display 804.

In addition, when the rating R was determined to be no less than $R_{TH}$, a virtually-stained image 802B (generated by the virtual staining device 226 at step 704 of the implemented algorithm of FIG. 7 based at least in part on image data corresponding to the image 802A) is also displayed in a corresponding display portion 804B. As shown in FIG. 8A, the virtually-stained image 802B (denoted with the "Virtual MT stain image") is chosen to be Masson's trichrome (MT) image. The controller 218 also causes the display 804 to exhibit indicia or legend 810B corresponding to the results of the automated evaluation of the image 802B by the system 200 and containing the information about whether or not the preparation of a specifically-stained physical sample is required. In a specific embodiment, where the display device 246 includes the display 804 configured as a touch-screen display, a portion 812B of the display is adapted to operate as a touch order-button, the activation of which by the user delivers a feedback signal to the controller 218 that triggers the corresponding computer-implemented specimen requestor 238 to register, accumulate, and transmit requests for preparation of the specifically-stained specimen to a recipient. In one embodiment, the recipient is the server 250, and the transmission of a request is effectuated through the controller 218, the communication sub-system 258, and the network 254.

In comparison with FIG. 8A, FIG. 8B illustrates the situation when the output produced by the resolving device 230 (at step 712 of the implemented algorithm of the invention) indicates that no specifically-stained biological specimen is required for final evaluation and diagnosis. Accordingly, while the controller 218 still causes the display device 246 to present an image 802A of the HE-stained target specimen in a respectively corresponding portion 804A of a display 804, no corresponding virtually-stained image 802B is displayed in the portion 804B. (Instead, as shown in the example of FIG. 8B, the display portion 804B is configured to display "NO STAIN") Moreover, the legend 810B additionally indicates that no specific staining is required. The corresponding touch order-button 812B is appropriately configured to not trigger the electronic circuitry and not initiate a request for a specifically-stained specimen.

In order to arrive at an ultimate diagnosis, the practice of histopathology sometimes requires an evaluation of several samples of a given tissue stained with different dyes. To accommodate such a need, an embodiment of the system of the invention is appropriately configured to create a plurality of different digitally-stained images, of the sample under test, that emulate the effects of actual staining of the sample with corresponding different specific dyes. The embodiment is further adapted to automatically evaluate each of these images as discussed above in reference to FIGS. 7, 8A, and 8B; to generate a corresponding rating $R_i$ for each of the ith image; and to generate an output indicative of priority of needs for preparation of actual samples stained with the corresponding different dyes.

Figure 8C:
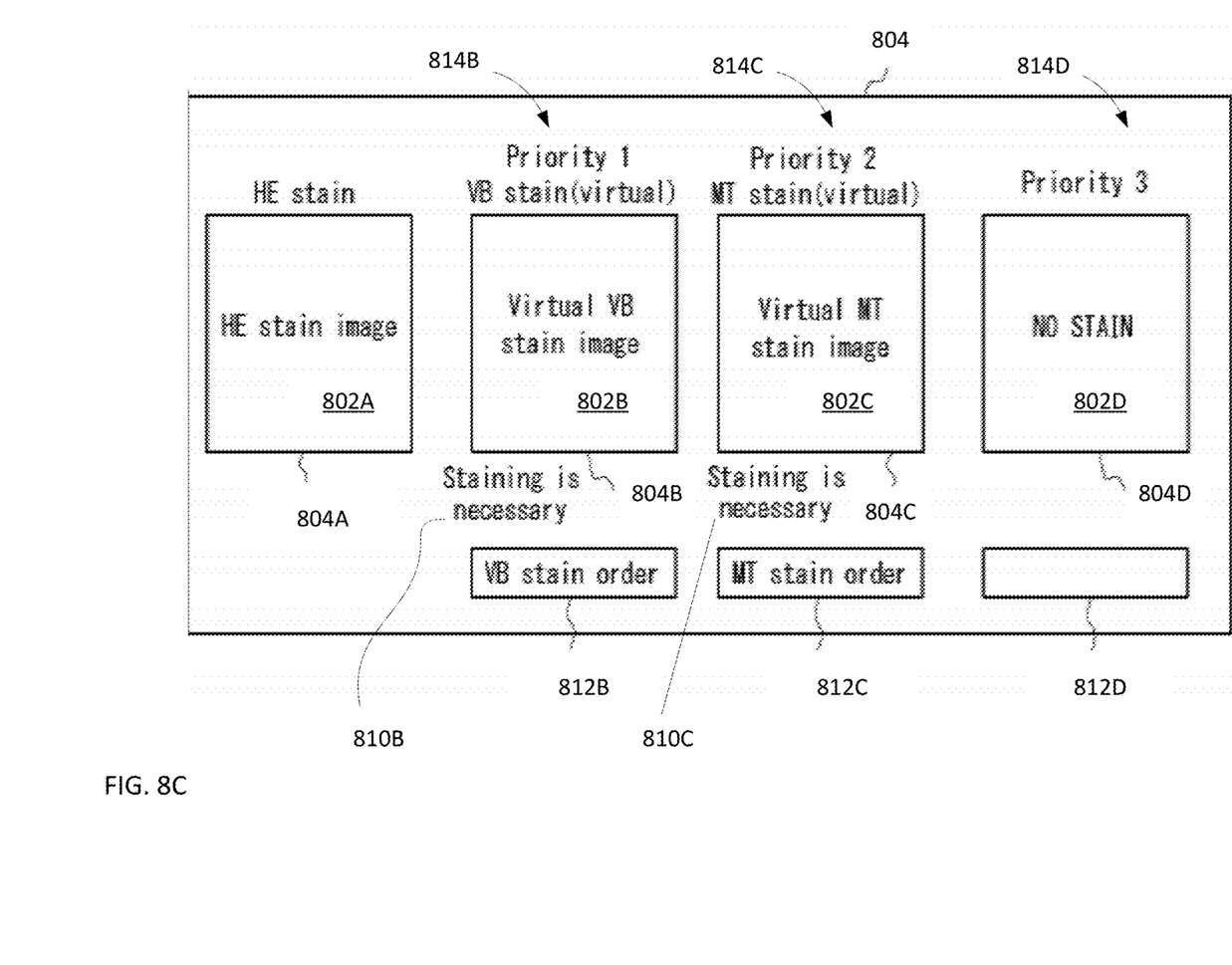
FIGS. 8C, 8D are alternative embodiments of a display indicating, in order of priority, a plurality of requests for specifically-stained samples.

A display portion of such embodiment is shown in FIG. 8C, where the display portions 804B, 804C, and 804D are used to display the results of digital-staining of the sample with corresponding specific dyes. As shown, the display portion 804A exhibits the image 802A of the HE-stained sample, the display portion 804B exhibits an image 802B (denoted with the "Virtual VB stain image") that has been digitally-stained with the VB stain, and the display portion 804C exhibits an image 802C (denoted with the "Virtual MT stain image") that has been digitally-stained with the MT stain. Indicia 810B and 810C respectively display the results of automated evaluation by the system, as described above, of the images 802B, 802C indicating that actual staining of physical samples with specific VB and MT dyes is indeed required for further evaluation by a histopathologist. Furthermore, for each of the digitally-stained images 802B, 802C the staining-necessity resolving device 230B determines a corresponding specific-staining rating $R_{802B}$ and $R_{802C}$. Based on the determined ratings ($R_{802B} > R_{802C}$ in the example of FIG. 8C), the controller 218 causes the display-order determining device 234 to organize the display of the corresponding images (802B, 802C), indicia (810B, 810C), and touch order-buttons (812B, 812C) in descending order of the corresponding ratings. In addition, the controller 218 is programmed to controllably cause the display device 246 to exhibit, in its display 804, the priority indicia 814B, 814C containing data that indicate the specific dye and determined rating respectively corresponding to a given image. In the example of FIG. 8C, the sample virtually stained with the VB dye is assigned higher priority than the sample virtually stained with the MT dye, as reflected in the priority indicia 814B stating "Priority 1" and priority indicia 814C stating "Priority 2".

As shown in FIG. 8C, no digitally-stained image is displayed in the display portion 804D, which indicates that the specific-staining rating $R_{802D}$ corresponding to this image was determined by the system to be below the corresponding threshold value and that the ultimate diagnosis does not require the preparation of a specifically-stained biological sample.

In further reference to FIGS. 2 and 8C, the electronic circuitry of the embodiment (not shown) that is connected to the respectively corresponding touch order-buttons 812B, 812C, and 812D is configured to initiate requests for preparation of the samples stained with respectively-corresponding dyes. Because the digital-staining with VB and MT dyes (used in the example of FIG. 8C) resulted in different specific-staining ratings ($R_{802B} > R_{802C}$, in the example of FIG. 8C), the specimen requestor 238, activated by the controller 218 in response to the user input applied to at least one of the touch order-buttons, is configured to register, accumulate, and transmit the requests to a recipient in order or priority established by the display-order determining device 234 and without waiting for the initial diagnosis by the histopathologist.

Figure 8D:
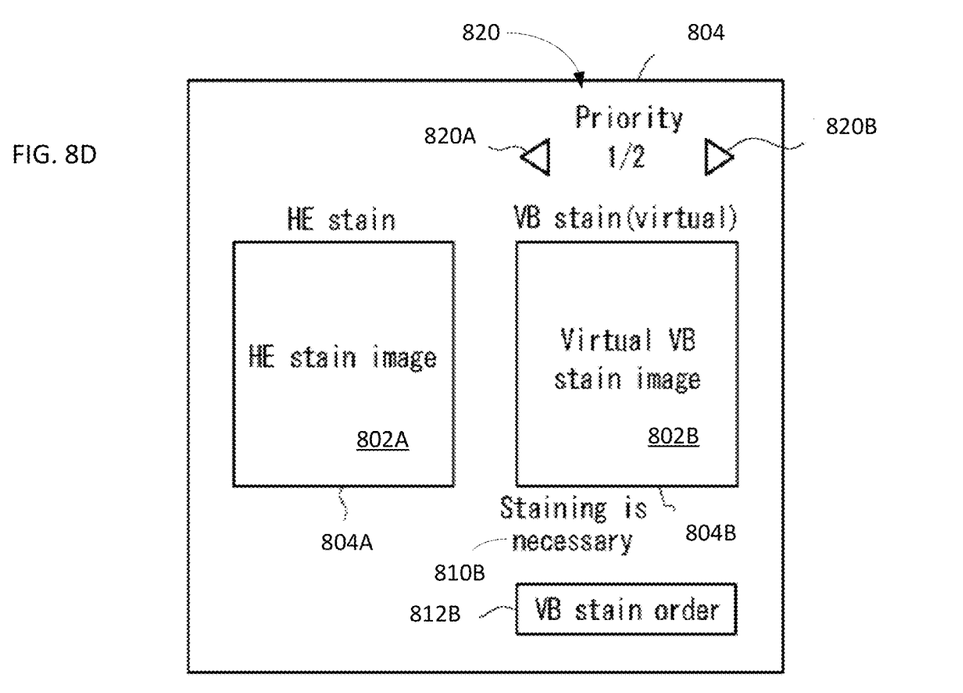

An implementation of the display device portion of the system that is alternative to that of FIG. 8C is schematically shown in FIG. 8D. Here, similarly to the embodiment discussed in reference to FIGS. 8A and 8B, the display 804 of the display device 246 of FIG. 2 is configured to exhibit only one digitally-stained image at a time even when several digitally-stained images have been created and evaluated by the embodiment of the system. (As shown, the digitally-stained image 802B corresponding to the VB dye is displayed in a display portion 804B). In this case, the created digitally-stained images and the respectively corresponding indicia and touch order-buttons are sequentially displayed in the priority order (as determined by the stain-necessity resolving device 230) and in the same portion of the display, by scrolling the priority menu 820 via activating appropriate directional buttons 820A, 820B.

In accordance with specific embodiments described with reference to FIGS. 2 through 9, a system and method are provided for supporting a process of evaluation of pathological image(s) and providing medical diagnosis based on such evaluation. Modifications and variations of the presented embodiments are also viewed to fall within the scope of the present invention. For example, in reference to FIGS. 8A through 8D, in an alternative embodiment the request for preparation of the specifically-stained samples is placed by the system automatically and not in response to the user input applied to the touch order-buttons 812A, 812B and the like. In reference to FIG. 2, in an alternative embodiment the system of the invention is configured such that at least one of the image-acquisition sub-system 210, memory storage and data storage device 214, input device 242, and display device 246 are stand-alone devices or systems including a microscope and a computer. Moreover, while described with respect to multispectral images and multispectral imaging systems, the current method can be applied to other imaging modalities such as, for example, imaging with the use of TEM or SEM, endoscopy, optical coherence tomography (OCT, optical frequency-domain imaging (OFDI), confocal microscopy, spectrally-modulated full-field optical coherence microscopy for ultrahigh-resolution endoscopic imaging (FFOCM), or image analysis of an appropriate chip hosting identified biological substance such as a circulating tumor cell chip (CTC).

What is claimed is:

1. An image-evaluation apparatus configured to support a process of medical diagnosis based on automated evaluation of an image of a biological sample, the apparatus comprising
   an optical system adapted to acquire imaging data representing a biological sample; and
   a processor in operable communication with said optical system and programmed
      to receive the acquired imaging data from the optical system,
      to generate a display signal adapted to cause an exhibit of a first visually-perceivable representation of a digitally-emulated reaction of the biological sample to a first chosen dye, and
      to cause generation of a first user-perceivable output representing a request to stain the biological sample with the first chosen dye.

2. An apparatus according to claim 1, wherein the processor is further programmed
   to cause generation of an image representing a change of an optical characteristic of the biological sample in response to the biological sample's being exposed to the first chosen dye, and
   to determine a first index associated with a ratio of (i) a first area of said image representing a change of said optical characteristic to (ii) an overall area of the image.

3. An apparatus according to claim 2, further comprising a tangible non-transitory computer-usable memory storage having stored thereon training data, and wherein the processor is programmed to access the tangible non-transitory computer-usable memory storage and to cause formation of said first visually-perceivable representation based at least on comparison of said first index with a first threshold value that is estimated using said training data.

4. An apparatus of claim 1, further comprising a display device configured to receive the display signal from the processor and to exhibit at least one of an image corresponding to said acquired imaging data and an image corresponding to said first visually-perceivable representation of a reaction of the biological sample to said first chosen dye.

5. An apparatus according to claim 1, further comprising
   a display device configured to exhibit said first visually-perceivable representation; and
   an electronic circuitry in electrical communication with the processor,
wherein the processor is further programmed to cause the electronic circuitry to generate a signal representing a request to stain the biological sample with the first chosen dye in response to a user input applied to the display device.

6. An apparatus according to claim 1, further comprising a display device controlled by said processor, wherein said processor being further adapted
   to cause generation of a second visually-perceivable representation of a digitally-emulated reaction of the biological sample to a second chosen dye,
   to case generation of a user-perceivable output representing a priority of need to stain the biological sample with the first and second chosen dyes, the priority of need being determined based at least on comparison of first and second indices,
   wherein the first index includes a measure of said digitally-emulated reaction of the biological sample to the first chosen dye and the second index includes a measure of said digitally-emulated reaction of the biological sample to the second chosen dye.

7. A medical diagnosis support system comprising:
   an input configured to acquire input data representing a type of biological tissue and a tentative medical condition of said biological tissue;
   a processor operably connected to said input and adapted to identify at least one specific dye based at least on said acquired input data and training data;
   an optical system adapted to acquire a multispectral image of said biological tissue that has been stained with a first dye;
   a first data-processing device configured to receive image data corresponding to said multispectral image and to transform said multispectral image to at least one virtually-stained image, which is configured to digitally emulate a spectral response of said tissue to staining with the identified at least one specific dye;
   a second data-processing device configured to generate at least one output, based at least on comparison of data representing the at least one virtually-stained image and the training data, wherein said at least one output represents a priority request to stain said biological sample with the at least one specific dye; and
   a user interface (UI) in communication with at least one of the first and second data-processing devices,
   wherein the UI is configured to display at least one of said multispectral image, said at least one virtually-stained image, and said at least one generated output, and
   wherein the UI is further configured to receive a user input predicated on said at least one generated output.

8. A support system according to claim 7, wherein the at least one output includes a number representing a portion of imaged biological tissue, spectral transmission parameters of which are indicative of said tentative medical condition.

9. A support system according to claim 7, wherein said second data-processing device is configured to generate at least one output based on comparison of a characteristic of the virtually-stained image and a threshold characteristic that is defined based on the training data.

10. A support system according to claim 7,
    wherein said at least one virtually-stained image includes a plurality of virtually-stained images,
    wherein said at least one generated output includes a plurality of generated outputs, and
    wherein the UI is configured to display the plurality of virtually-stained images and a plurality of generated outputs in order that conforms to an order of respectively corresponding priority requests.

* * * * *